(12) United States Patent
Kresina (10) Patent No.: US 7,989,714 B2
(45) Date of Patent: *Aug. 2, 2011

(54) HIGH CAPACITY AND HIGH RESOLUTION SCALE

(75) Inventor: Roman Kresina, Oxford, CT (US)

(73) Assignee: Neopost Technologies, Bagneux (FR)

( * ) Notice: Subject to any disclaimer, the term of this patent is extended or adjusted under 35 U.S.C. 154(b) by 287 days.

This patent is subject to a terminal disclaimer.

(21) Appl. No.: 12/188,516

(22) Filed: Aug. 8, 2008

(65) Prior Publication Data
US 2009/0090564 A1    Apr. 9, 2009

Related U.S. Application Data

(63) Continuation-in-part of application No. 11/867,968, filed on Oct. 5, 2007, now Pat. No. 7,569,779.

(51) Int. Cl.
*G01G 1/38* (2006.01)
(52) U.S. Cl. ............................. 177/210 EM; 177/212
(58) Field of Classification Search ........... 177/210 EM, 177/212–214
See application file for complete search history.

(56) References Cited

U.S. PATENT DOCUMENTS

| | | | |
|---|---|---|---|
| 3,120,754 A | 2/1964 | Lebow | |
| 3,791,467 A | 2/1974 | Swersey et al. | |
| 4,039,036 A | 8/1977 | Baumgartner et al. | |
| 4,354,563 A * | 10/1982 | Luchinger et al. | 177/212 |
| 4,375,243 A | 3/1983 | Doll | |
| 4,554,987 A | 11/1985 | Dillon | |
| 4,632,198 A | 12/1986 | Uchimura et al. | |
| 4,660,667 A | 4/1987 | Uchimura et al. | |
| 4,771,314 A | 9/1988 | Parker et al. | |
| 4,778,016 A | 10/1988 | Uchimura et al. | |
| 5,190,117 A | 3/1993 | Freeman et al. | |
| 5,347,092 A | 9/1994 | Buchs et al. | |
| 5,393,936 A | 2/1995 | Tyhy et al. | |
| 5,850,057 A | 12/1998 | Veillette | |
| 5,998,742 A | 12/1999 | Liu et al. | |
| 6,248,987 B1 | 6/2001 | Feher et al. | |
| 6,284,987 B1 * | 9/2001 | Al-Modiny | 177/170 |
| 6,936,776 B2 | 8/2005 | Germanton | |
| 7,256,358 B2 * | 8/2007 | Kesselman | 177/177 |
| 7,569,779 B2 * | 8/2009 | Kresina | 177/210 EM |

* cited by examiner

*Primary Examiner* — Randy W Gibson (74) *Attorney, Agent, or Firm* — Morris & Kamlay LLP (57) ABSTRACT

A scale can include a low capacity sensing mechanism operatively coupled to a load, wherein the low capacity sensing mechanism may detect movement of the load. A transfer mechanism can be operatively coupled to the low capacity sensing mechanism, wherein the low capacity sensing mechanism may enable the scale to weigh both relatively heavy loads and relatively light loads to a minor division resolution associated with the low capacity sensing mechanism.

17 Claims, 6 Drawing Sheets

HIGH CAPACITY AND HIGH RESOLUTION SCALE

CROSS-REFERENCES TO RELATED APPLICATIONS

This application is a continuation-in-part of U.S. patent application Ser. No. 11/967,968 filed Oct. 9, 2007, the entirety of which is incorporated by reference herein.

FIELD OF THE INVENTION

Embodiments of the present invention generally relate to scales. More particularly, embodiments of the present invention relate to scales having the ability to weigh very heavy objects to a high degree of resolution.

BACKGROUND OF THE INVENTION

Typical scales are passive measuring instruments that can be used in a wide variety of environments such as automotive, health provider and mail handling environments. For example, modern day postal operations may involve determining package handling and routing procedures, as well as postage, which are all a function of the size and weight of the package. In addition, the size and weight of the packages being processed can vary greatly in a particular setting. Indeed, it may not be uncommon for a given mail handling facility to be required to determine the weight of 0.25 oz letters, as well as 100 lb packages and letter bins. Conventional 0.25 oz scales may not be able to withstand the weight of 100 lb objects, and conventional 100 lb scales may not be able to detect the removal of a single letter from a letter bin containing thousands of letters (or be able to determine the weight of a single letter with an accuracy of $1/32$ oz, for example). Given the significant range of weights of the objects and the resolution required for each task, more than one scale may be required in an environment in order to accommodate measurement of varying weights and desired resolutions. Solutions to determine object weight by measurement of a counterbalancing drive current are known. However such solutions provide weight measurement only following complete counterbalancing of the object weight, and may therefore require substantial time to complete a weight measurement. Accordingly, the state of the art will be advanced by a scale arrangement that overcomes these drawbacks.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION OF THE INVENTION

Embodiments of the present invention provide for an active scale including a low capacity sensing mechanism operatively coupled to a support platform or member, wherein the low capacity sensing mechanism may detect movement resulting from a weight of an object, or load, placed upon the support platform. An example of a low capacity sensing mechanism is a load cell including four strain gauges arranged as a Wheatstone bridge. A force transfer mechanism is operatively coupled to the low capacity sensing mechanism and responsive to an amount of load placed upon the scale, thereby enabling the scale to weigh loads in excess of a capacity of the low capacity sensing mechanism. In further embodiments, the transfer mechanism enables measurement of weight exceeding the capacity of the low capacity sensing mechanism to a minor division resolution associated with the low capacity sensing mechanism. Embodiments of the transfer mechanism can include a lever assembly and an electromagnetic actuator.

The lever assembly includes a lever that is operatively coupled to at least one of the support member and the low capacity sensing mechanism. The lever assembly is responsive to lever movement resulting from placement of the object upon the support member to reduce the effect of the weight upon the low capacity sensing mechanism. In one embodiment, an electromagnet actuator is operatively coupled to the low capacity sensing mechanism and the lever to reduce or neutralize the load upon the low capacity sensing mechanism via the lever. In one embodiment, the scale is a postal scale, incorporated within a postal metering device. It will be appreciated that details pertaining to operation of a postal metering device are known, and will not be presented herein. Embodiments of the scale may therefore have a weight capacity-to-resolution ratio of four or more orders of magnitude. For example, the scale may accurately weigh an object on the order of $10^3$ grams to an accuracy of $10^{-1}$ grams.

Figure 1:
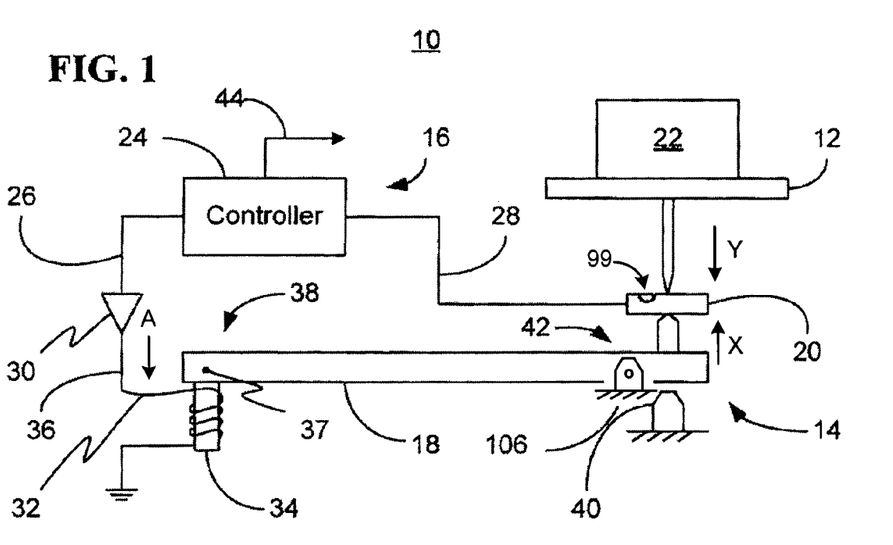
FIG. 1 is a diagram of a scale in which a controller generates weight measurements according to an embodiment of the present invention.

FIG. 1 shows an active scale 10 generally having a support member 12, a low capacity sensing mechanism such as a sensor 20, and a force transfer mechanism that may include a force transfer assembly 14 (also herein referred to as a "lever assembly") and an electromagnetic actuator 16 (also herein referred to as an "electromechanical force inducing mechanism"). The illustrated scale 10 may be used in a wide variety of applications such as postal applications, automotive applications, health care provider applications, etc., and provides a relatively high level of resolution (e.g., minor division resolution of $\frac{1}{32}$ oz) while maintaining the ability to weigh relatively heavy objects (e.g., 100 lbs). In particular, the lever assembly 14 of the transfer mechanism can include a force transmitter 18 (also herein referred to as a "lever"), wherein the sensor 20 is able to detect movement of the support 12 associated with a weight of an object 22 disposed upon the support 12. It will be appreciated that movement of the support 12 may result in a corresponding movement of the lever 18.

The illustrated electromagnetic actuator 16 is operatively coupled to the sensor 20 and the lever 18 to neutralize the load on the sensor 20. By using the electromagnetic actuator 16 as a transfer mechanism to neutralize the load resulting from the object 22, the scale 10 can weigh very heavy objects such as vehicles, humans, and large bins of mail. Furthermore, by using the sensor 20 having a high sensitivity, the illustrated scale 10 is able to detect slight load changes, such as the addition or removal of a single mailing envelope for example. Accordingly, the active scale 10 provides greater capacity and resolution than conventional passive measuring scales. Furthermore, a ratio of the scale's weight capacity to its resolution may be limited only by frictional forces in components such as bearings at pivot 37.

In particular, the illustrated electromagnetic actuator 16 includes a controller 24, such as a servo controller, that is configured to generate a drive signal 26 based upon a feedback signal 28 (also herein referred to as a "sensor signal") from the sensor 20, wherein the feedback signal 28 is responsive to and indicative of at least one of movement of the lever 18 and detection, via the sensor 20, of the weight of the object 22 placed upon the support 12. In one embodiment, the drive signal 26 and feedback signal 28 are analog signals. The illustrated electromagnetic actuator 16 also includes a power amplifier 30, and a force inducing mechanism such as a solenoid having a coil 32 and a plunger 34. The power amplifier 30 may amplify the drive signal 26 from the controller 24 and provide the amplified drive signal 36 to the coil 32. The illustrated coil 32 produces an electromagnetic field in response to the amplified drive signal 36.

The plunger 34 may be coupled to a driving end 38 of the lever 18 via pivot 37 and is responsive to the electromagnetic field produced by the current in the coil 32 to translate in a direction A at the driving end 38. Translation of the plunger 34 thereby causes rotation of the lever 18 about pivot 106 and generation of a force in a direction X at a counterforce end 42 of the lever 18. The force in the direction X opposes a force in a direction Y that results from the weight of the object 22 upon the support 12. For example, if additional weight (e.g., another letter) is added to the support member 12, the increased load results in an increased feedback signal 28 generated by the sensor 20, thereby notifying the controller 24 of the increased load. The controller 24 may then increase the current to the coil 32, forcing the driving end 38 of the lever 18 downward about pivot 106 and the counterforce end 42 upward to effectively neutralize the additional weight placed upon support 12. Similarly, if weight is removed from the support member 12, the decreased load on the sensor 20 results in a reduced feedback signal 28 and thus the controller 24 is notified of the associated reduced load, and may reduce the current to coil 32 appropriately. In either instance, the illustrated controller 24 is also configured to generate a weight measurement 44.

While the transfer mechanism compensates for the weight of the object 22 that is greater than a capacity of the sensor 20, the weight measurement 44 may be generated: upon neutralization of the weight of the object 22 relative to the sensor 20; or as the weight of the object relative to the senor 20 approaches neutralization. In the first instance, the controller 24 may adjust the drive signal 26 current until the weight of the object 22 upon the sensor 20 is approximately zero, and calculate the weight measurement 44 based on the drive signal 26 current required to neutralize the load relative to the sensor 20. This example may be useful in configurations in which the sensor 20 indicates a zero "steady-state" condition corresponding to neutralization of the total weight of the object 22, but does not produce weight measurements. In the second instance, the controller 24 may generate the weight measurement 44 based on the drive signal 26 and the feedback signal 28 as the controller 24 makes drive signal 26 adjustments. This example may be useful in configurations in which the sensor 20 is a device such as a load cell 99 for example, that is able to produce intermediate weight measurement signals that may be summed with contemporaneous weight signals resulting from calculation based upon the drive signal 26. In this regard, one embodiment of the sensor 20 may include a strain gauge load cell 99, responsive to deformation of sensor 20 bulk material, disposed between and adjacent to the support member 12 and the counterforce end 42 of the lever 18 (e.g. shown disposed to the left of support member 12 and counterforce end 42 in FIG. 1). For example, the force applied in the direction X via the counterforce end 42 effectively neutralizes or reduces sensor 20 bulk material deformation, as influenced by the weight of object 22 applied in the direction Y upon the load cell 99.

An embodiment of scale 10 includes a stop 40 to limit displacement of the support 12 via counterforce end 42 of the lever 18. In an embodiment, use of the load cell 99 to provide intermediate weight calculations (in conjunction with the weight calculations based upon the drive signal 26) is contemplated to enable faster operation of the scale 10 to provide expedient weight measurements. While an embodiment has been described utilizing a load cell 99 as a sensor, it will be appreciated that the scope of the invention is not so limited, and is contemplated to include alternate sensors, such as optical, linear variable differential transformer (LVDT), micro-electro-mechanical system (MEMS), and piezoelectric sensors. It will be further appreciated that some of these sensors, such as LVDT and optical sensors for example, are position sensors and primarily sense displacement in response to applied force. Additionally, although the illustrated actuator 16 uses a solenoid to neutralize the load, it will be appreciated that other technologies such as a stepper motor, a linear motor, or other electromechanical force inducing mechanisms may be used without parting from the spirit and scope of embodiments described herein.

Figure 2:
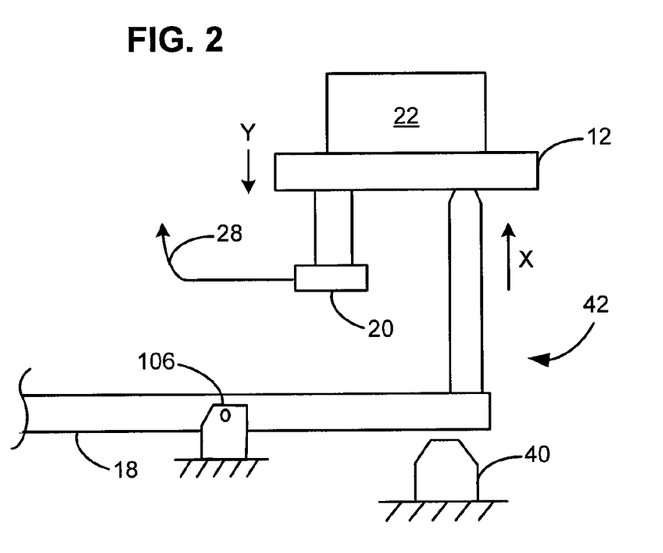
FIG. 2 is a diagram of a force coupling arrangement of a scale according to an embodiment of the present invention.

FIG. 2 depicts an embodiment having the support member 12 operatively coupled to the sensor 20 and the counterforce end 42 of the lever 18 operatively coupled to the support member 12 and having pivot 106. The arrangement depicted in FIG. 2 functions as described above to effectively reduce or neutralize the weight of the object 22 upon sensor 20. It will be appreciated that use of the arrangement of FIG. 2 can reduce total force applied to sensor 20 to accommodate use of alternate sensor 20 technologies, such as a piezoelectric sensor, for example.

Figure 3A:
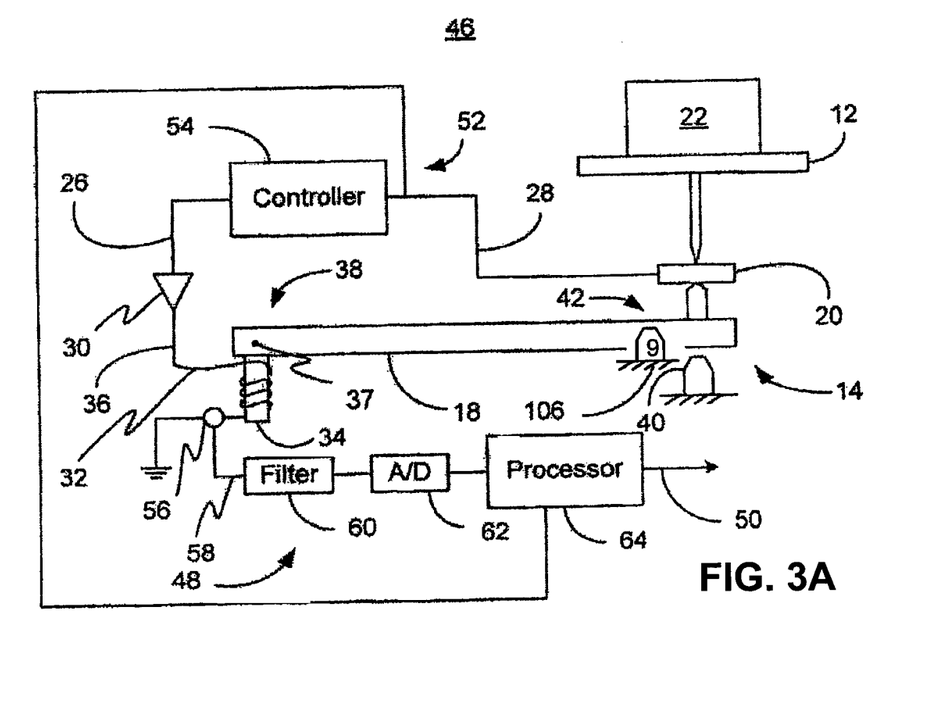
FIG. 3A is a diagram of a scale in which a weight calculation circuit generates weight measurements according to an embodiment of the present invention.

FIG. 3A depicts an embodiment of a scale 46 including a weight calculation circuit 48 that generates a weight measurement 50. In particular, the illustrated weight calculation circuit 48 has an interface with an electromagnetic actuator 52 (also herein referred to as an "electromechanical force inducing mechanism"), which includes a controller 54, power amplifier 30, coil 32, and plunger 34. In one embodiment, the interface is a current sensor 56 that detects the voltage across a relatively small known resistance that is in series with the coil 32 in order to measure an actuation current flowing through the coil 32 in response to provision of the amplified drive signal 36. The result may be an analog measurement signal 58 that is proportional to the amount of force required to neutralize the load upon sensor 20. The illustrated circuit 48 also includes an analog filter 60 to filter the analog measurement signal 58 and an analog to digital (A/D) converter 62 to convert the filtered measurement signal into a digital measurement signal. A processor 64 may be used to determine the weight of the object 22 based on the digital measurement signal and generate the weight measurement 50. In particular, the processor 64 may perform a running average calculation to enhance accuracy. The processor 64 may also generate the weight measurement 50 based on the feedback signal 28 to the extent that the sensor 20 is able to produce weight measurements and/or the scale 46 is not in compensation mode (using the sensor 20 indicative of the zero "steady-state" condition), as already discussed.

Figure 3B:
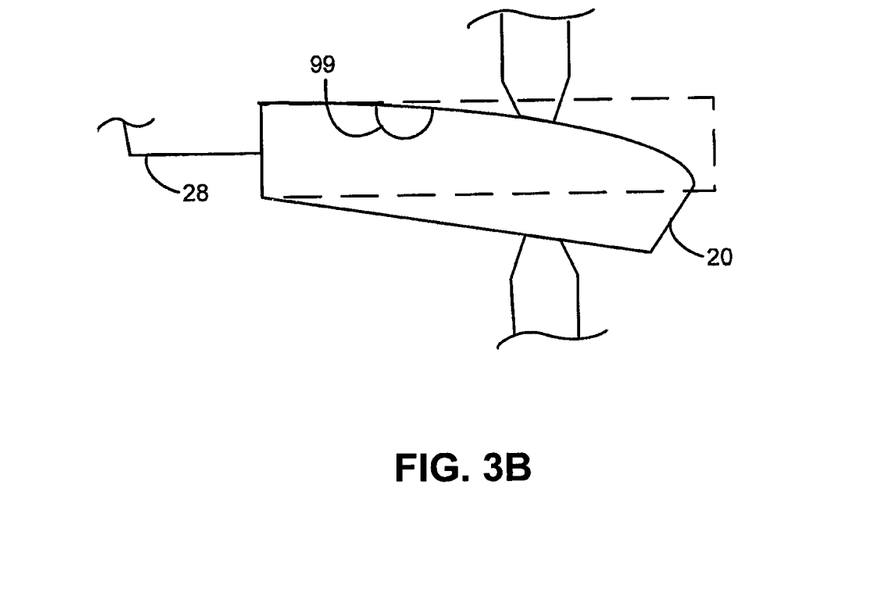
FIG. 3B is a diagram of a sensor flexing under a load in accordance with an embodiment of the present invention.

In accordance with embodiments of the present invention, the weight of object 22 can be determined by controller 24, 54 or processor 64 detecting that sensor 20 is, or will be, operating outside of its weight range under the load of the object 22. For example, sensor 20 can be a load cell including the strain gauge 99 as shown in FIG. 1. The strain gauge 99 is mounted on a substrate that flexes under the weight of an object 22 placed on platform 12. The range over which the substrate may flex, and the strain gauge 99 provides desired accuracy, is finite. FIG. 3B depicts such flexure of the sensor 20 including the strain gauge 99 in response to application of the object 22 upon platform 12.

If an object 22 having too heavy a weight is placed upon support 12, it can cause the substrate to flex to its maximum extent and depress counterforce end of lever 18 until it contacts stop 40. The signal from the load cell 20 will not be representative of the weight of the object 22 under such conditions. Controller 24, 54 can be programmed to detect when the load cell is at or approaching the limit of its weight range based upon the feedback signal 28 from the load cell 20 that indicates the substrate is flexing beyond a certain predetermined limit. Upon detecting such a condition, controller 24, 54 can drive current to the electromechanical force inducing mechanism 16, 52 to produce a counterforce at the counterforce end 42 of the lever 18 underneath load cell 20, reversing the flexion of the substrate and restoring the load cell 20 to operation within its weight range. That is, the counterforce reduces the flexion of the substrate caused by the weight of the object 22 transmitted to the load cell 20 through platform 12 to within the predetermined limit. Processor 64 may then calculate the weight of the object 22 based upon the amount of current driven to the electromechanical force inducing mechanism 16, 52 and a signal received from the load cell. The current driven to the electromechanical force inducing mechanism 16, 52 need only be applied within the tolerance required to restore the load cell to operation anywhere within its weight range. In this way, a more accurate and expedient measurement may be made of the weight of the object 22. The sensitivity of the measurement made by the load cell when operating within its weight range can be combined with the known amount of current driven to the electromechanical force inducing mechanism 16, 52 to produce an accurate weight measurement of object 22.

Figures 4A, 4B:
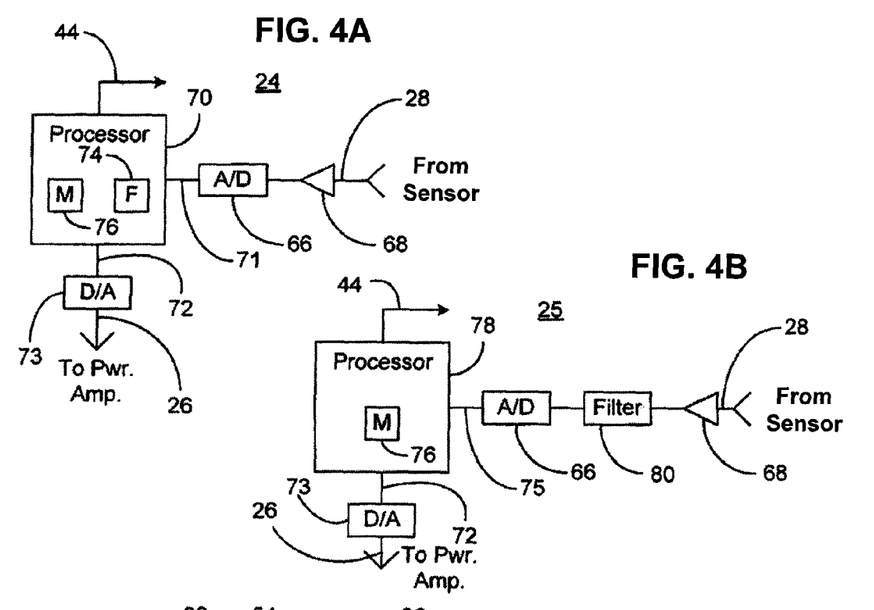
FIG. 4A is a diagram of a controller having digital filtering and measurement functionality according to an embodiment of the present invention.
FIG. 4B is a diagram of a controller having digital measurement and analog filtering functionality according to an embodiment of the present invention.

FIG. 4A depicts a schematic diagram of one example of the controller 24 (FIG. 1) in greater detail. In the illustrated example, the controller 24 includes a pre-amplifier 68 that is configured to amplify the feedback signal 28 from the sensor 20 (FIG. 1) and an A/D converter 66 that converts the amplified feedback signal into a digital feedback signal 71. A processor 70 determines and generates a digital drive signal 72 based on the digital feedback signal 71, wherein a digital to analog (D/A) converter 73 converts the digital drive signal 72 into the analog drive signal 26 already discussed. The illustrated processor 70 also includes filtering logic 74 that filters the digital feedback signal 71 and measurement logic 76, thereby determining the weight of the object 22 (FIG. 1) based upon the digital drive signal 72 and/or the digital feedback signal 71. As previously discussed, the weight is then provided via weight measurement 44.

FIG. 4B depicts a schematic diagram of an embodiment of an alternate controller 25. Controller 25 includes an analog filter 80 that filters the amplified feedback signal from the pre-amplifier 68 and provides the filtered feedback signal to the A/D converter 66. In this case, a processor 78 determines and generates the digital drive signal 72 based on a digital feedback signal 75. Processor 78 uses measurement logic 76 to determine the weight of the object 22. Use of the analog filter 80 eliminates the digital filtering logic required by controller 24 depicted in FIG. 4A.

Figure 5A:
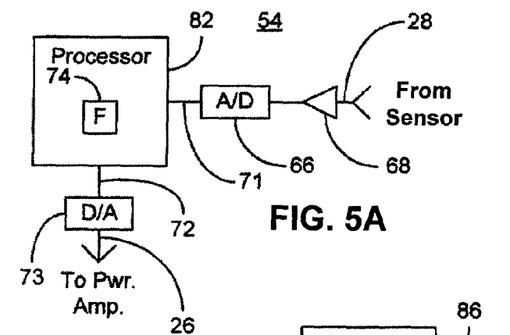
FIG. 5A is a diagram of a controller having digital filtering functionality according to an embodiment of the present invention.

FIG. 5A depicts a schematic diagram of an embodiment of controller 54 (FIG. 3) in greater detail. In particular, the controller 54 has a processor 82 that includes filtering logic 74 to filter the digital feedback signal 71, but excludes measurement logic because the weight measurement is made by the weight measurement circuit 48 (FIG. 3).

Figure 5B:
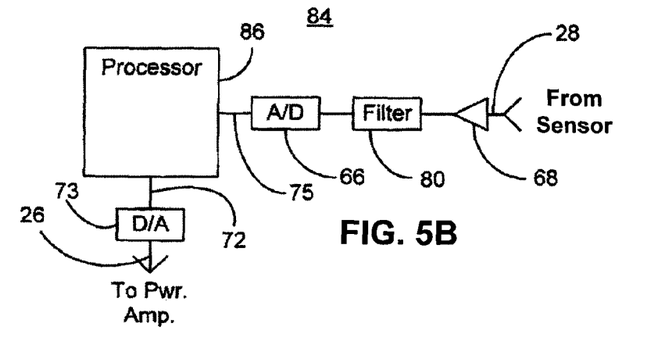
FIG. 5B is a diagram of a controller having analog filtering functionality according to an embodiment of the present invention.

FIG. 5B depicts a schematic diagram of an embodiment of an alternate controller 84 in which a processor 86 determines and generates the digital drive signal 72, but does not filter the feedback signal 28 or determine the weight of the object 22.

Figure 6:
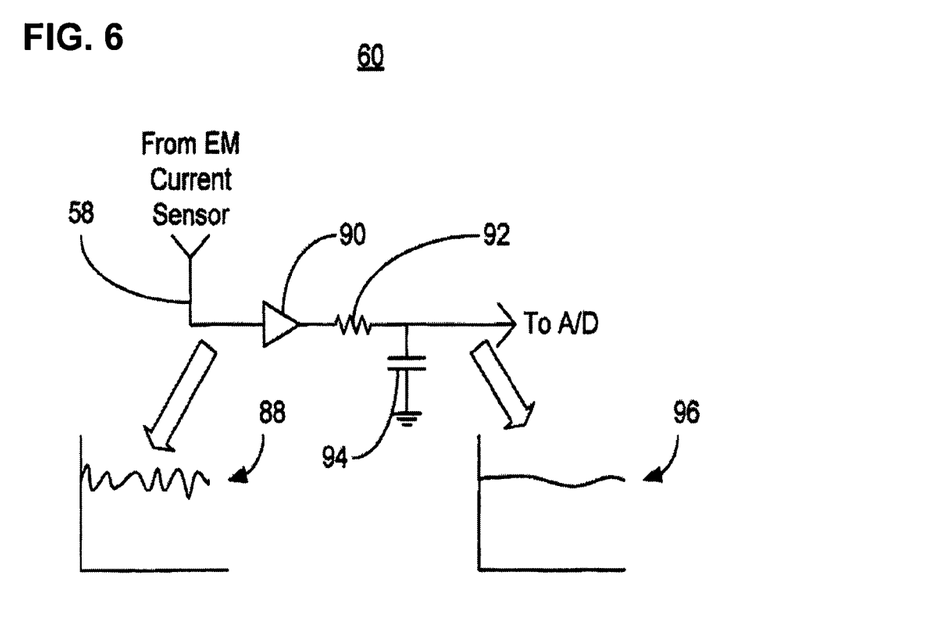
FIG. 6 is a schematic diagram of an analog filter according to an embodiment of the present invention.

FIG. 6 depicts one example of the low pass filter 60 that may be used to process signals from the electromagnetic actuator current sensor 56 (FIG. 3). In the illustrated example, analog measurement signal 58 exhibits slight variability due to vibration and/or other factors as shown in input trace 88. An amplifier 90, resistor 92, and capacitor 94 combination, form a low pass filter and yield a filtered measurement signal with less variation as reflected in an output trace 96. Other possible implementations of this and other filtering processes can include transforms such as Laplace transforms.

Figure 7:
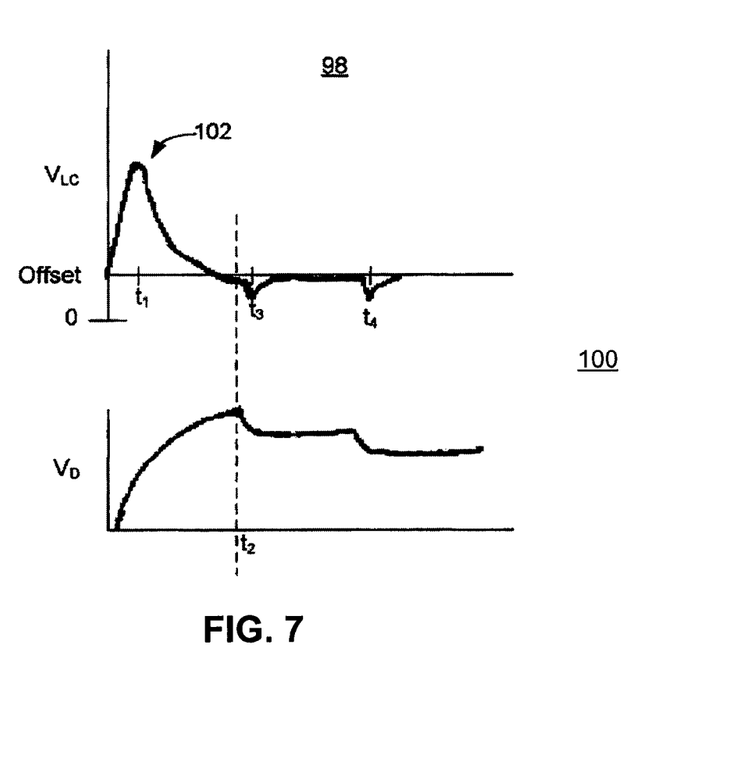
FIG. 7 are plots of a load cell voltage curve and a power amplifier drive signal according to embodiments of the present invention.

Turning now to FIG. 7, a load cell voltage plot 98 and a drive signal plot 100 illustrate an example of scale operation as described above. In particular, a stack of mail may be placed on the scale 10, 46 (FIGS. 1 and 3A), causing a voltage of the sensor ($V_{LC}$) (such as load cell 99 for example), also herein referred to as the load cell voltage, to grow to a peak 102 at time $t_1$. During this period, a voltage of the drive signal 26, depicted as ($V_D$) and also herein referred to as a drive signal voltage, increases and thereby reduces the load upon the sensor 20. This causes the load cell voltage offset to decrease after the peak at time $t_1$. In response to the load cell voltage approaching zero offset, the drive signal voltage levels off ($t_2$) to a steady state value. At the illustrated time $t_3$, a letter is removed from the pile, which causes the drive signal voltage to reduce and thereby return the load cell voltage towards zero offset, where the drive signal voltage will level off. At the illustrated time $t_4$, another letter is removed from the pile, which causes another reduction of the drive signal voltage to thereby return the load cell voltage towards zero offset. As described above, the drive signal voltage remains at a constant or substantially constant value once the load upon the sensor 20 has been neutralized.

Figure 8:
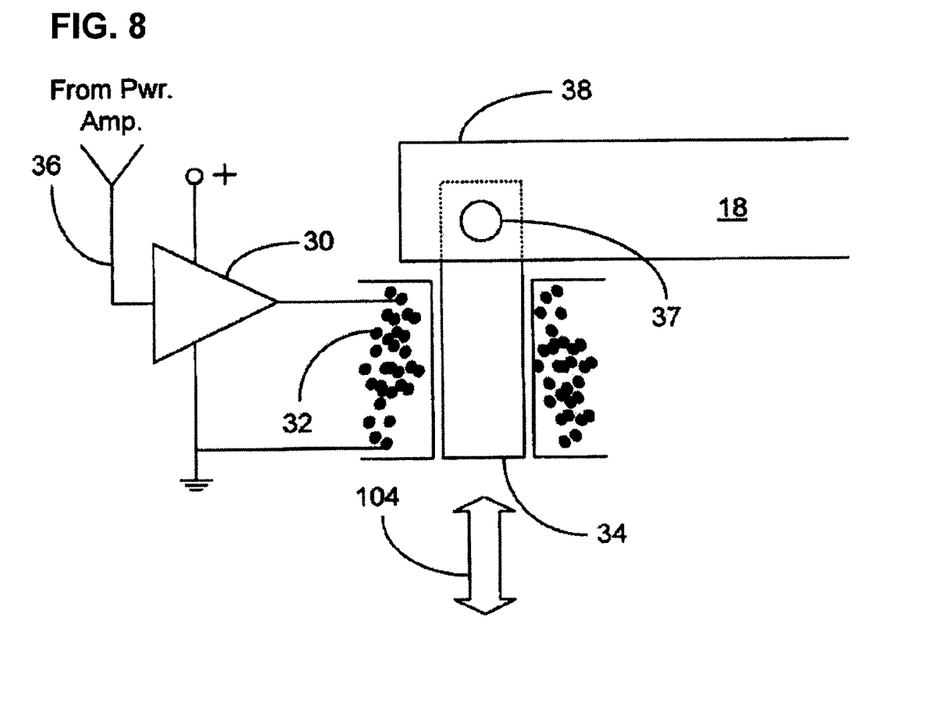
FIG. 8 is a diagram of an enlarged view of an electromagnet configuration according to an embodiment of the present invention.

FIG. 8 depicts a schematic diagram of an embodiment of a solenoid having a coil 32 and plunger 34. The plunger 34 is responsive to the electromagnetic field produced by the actuation current flowing through the coil 32 to translate. The plunger 34 is pivotally coupled to the driving end 38 of the lever 18 via pivot 37. Pivot 37 allows plunger 34 to translate in a generally vertical orientation while lever 18 rotates about pivot 106 (best seen with reference to FIG. 1). For example, the plunger 34 may be a high strength magnet plunger having a generally vertical magnetic polarization 104. A small current sensing resistor (not shown) may also be used as an interface between the weight calculation circuit 48 (FIG. 3) and the coil 32. As already noted, other solutions such as stepper motors, linear motors, and other electromagnetic force inducing mechanisms may also be used.

Figure 9A:
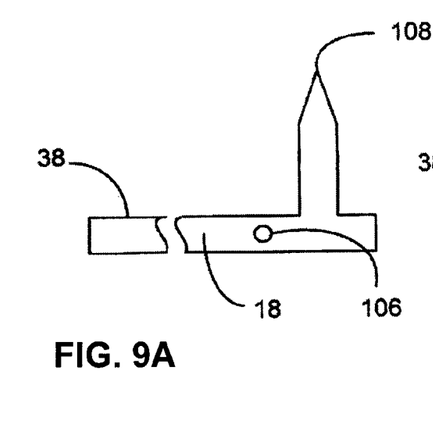
FIG. 9A is a diagram of a counterforce end of a lever having a pivot point that is laterally located between a driving end of the lever and a load cell contact point according to an embodiment of the present invention.
Figure 9B:
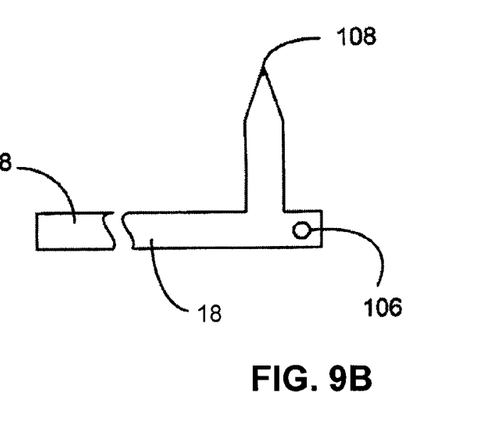
FIG. 9B is a diagram of a counterforce end of a lever having a load cell contact point that is laterally located between a driving end of the lever and a pivot point of the lever according to an embodiment of the present invention.

FIGS. 9A and 9B depict various configurations of the position of the pivot 106 relative to the lever 18. In particular, FIG. 9A illustrates an example in which the lever 18 has pivot point 106 laterally located between the driving end 38 of the lever 18 and a support member interface point 108, whereas FIG. 9B illustrates an example in which lever 18 has a support member interface point 108 that is laterally located between the driving end 38 of the lever 18 and the pivot point 106 of the lever 18. It will be appreciated that alternate configurations of the position of the pivot 106 relative to the lever 18 can accommodate alternate directions of force applied to the driving end 38 as well as to provide an appropriate multiplication ratio of force as applied to the driving end 38 and by support member interface point 108.

Figure 10A:
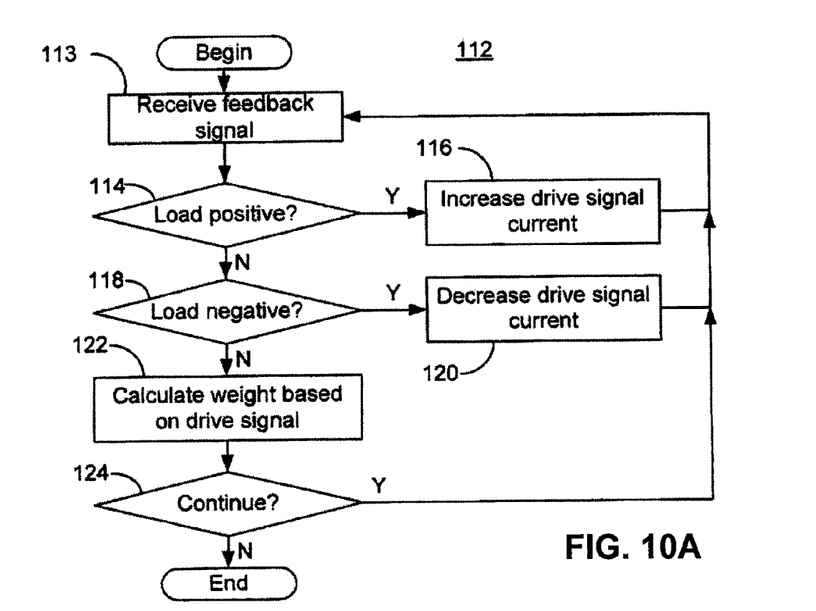
FIG. 10A is a flowchart of a method of weighing an object upon neutralization of a load according to an embodiment of the present invention.
Figure 10B:
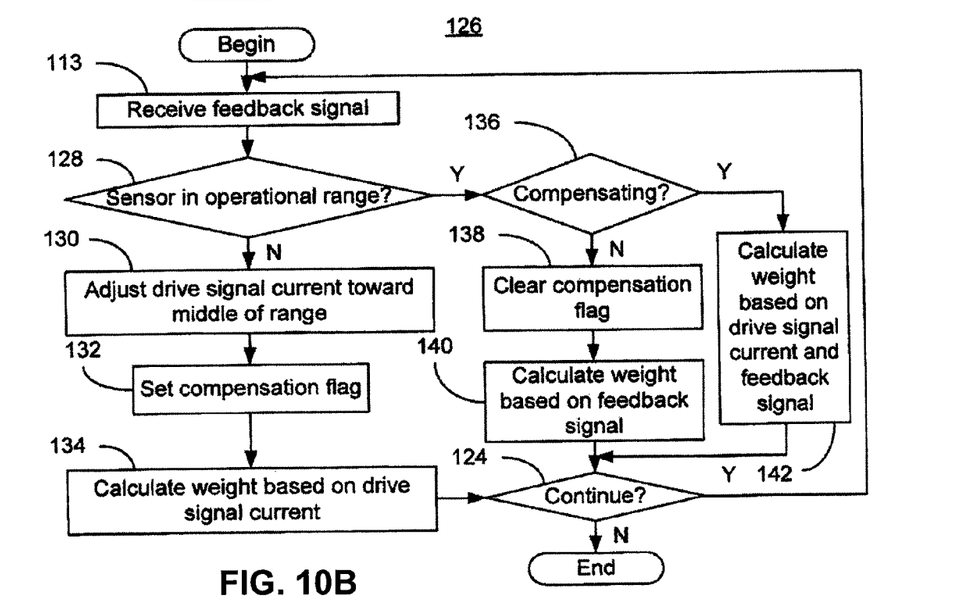
FIG. 10B is a flowchart of a method of weighing an object prior to neutralization of a load according to an embodiment of the present invention.

Turning now to FIGS. 10A and 10B, flowcharts of methods 112 and 126 of operating a scale are shown, respectively. The methods 112 and 126 may be implemented in a controller and/or weight calculation circuit as a set of processor-executable instructions stored in any suitable computer-readable media, such as read only memory (ROM), random access memory (RAM), electrically erasable programmable ROM (EEPROM), flash memory, etc., as fixed functionality hardware such as an embedded microcontroller, application specific integrated circuit (ASIC), etc. using complementary metal oxide semiconductor (CMOS) technology or transistor-transistor-logic (TTL), or any combination thereof. In particular, the scale may be operated in response to a feedback signal indicative of a load corresponding to an object on a support member of the scale.

In the depicted flowchart of FIG. 10A, weight measurements are made based on the amount of force required to neutralize the load. For example, process block 113 provides for receiving the feedback signal 28 and block 114 provides for determining whether the load is positive (e.g., pushing the counterforce end 42 of the lever 18 down as depicted in FIGS. 1 and 3, such that the weight of the object 22 exceeds the capacity of the sensor 20). If so, the drive signal 26 current/voltage is increased at block 116. It is understood that depending upon the direction of the electromagnetic field and plunger 34 polarization, the positive/negative and/or increasing/decreasing designations may be reversed without parting from the spirit and scope of the embodiments described. If it is determined that the load is not positive, block 118 provides for determining whether the load is negative (e.g., application of a force by the counterforce end 42 of the lever 18 that exceeds the force exerted upon sensor 20 by the support member 12). In response to determining that the load is negative, the drive signal 26 current/voltage is decreased at the illustrated block 120. Otherwise, it can be determined that the load has been neutralized and the weight of the object can be calculated at block 122 based on the drive signal 26. Thus, the illustrated example makes weight calculations based on the drive signal 26 once the load upon the sensor 20 has been neutralized. As already discussed, the weight determination may be based on other factors such as the amount of current sensed in the electromagnetic actuator 16, 52. Block 124 determines whether to continue taking readings and compensating for load variations.

FIG. 10B shows an alternative method 126 in which weight calculations may be made before the load has been fully neutralized. The illustrated example is particularly useful for applications using a sensor 20 incorporating the load cell 99, which may be capable of generating feedback signals that are indicative of weight. In particular, block 113 provides for receiving the feedback signal 28 and block 128 provides for determining whether the sensor 20 (e.g., load cell) is within its operational range based on the feedback signal 28. For example, if the load cell 99 is rated at a maximum load of 5 lbs and the feedback signal 28 indicates a weight of 3½ lbs, it can be determined that the load cell 99 is functioning within the operational range. If, however, the load cell 99 indicates a weight of 5 lbs (or overload/error), it can be determined that the load cell 99 is outside the operational range.

If the load cell 99 is outside its operational range, illustrated block 130 provides for adjusting a drive signal 26 current of a transfer mechanism (e.g., actuator and/or lever assembly) toward the middle of the operational range, and illustrated block 132 provides for setting a compensation flag to indicate that the transfer mechanism is in compensation mode. The compensation flag may be a bit stored in memory, wherein the value of the bit indicates whether the transfer mechanism is compensating for the load cell 99. The weight of the object 22 may be calculated at block 134 based on the drive signal 26 current.

If the load cell 99 is within its operational range, illustrated block 136 provides for determining whether the transfer mechanism is in compensation mode. Thus, the determination at block 136 may be made by checking the aforementioned compensation flag. If the transfer mechanism is not in compensation mode, illustrated block 138 provides for clearing the compensation flag, and illustrated block 140 provides for calculating the weight of the object 22 based on the feedback signal 28. If the transfer mechanism is in compensation mode, the weight of the object 22 may be calculated at block 142 based on the drive signal 26 current and the feedback signal 28. In particular, the weight calculated from the drive signal 26 current may be summed with the weight indicated by the feedback signal 28 to obtain an "intermediate" weight while the transfer mechanism works toward neutralizing the load. It will be appreciated that such an intermediate weight may be provided more quickly than the weight calculations described above, with reference to FIG. 10A, following neutralization of the load.

Embodiments described herein therefore provide a relatively high level of resolution (e.g., minor division resolution of 1/32 oz) while maintaining the ability to weigh relatively heavy objects (e.g., 100 lbs). For example, such a ratio of weight capacity-to-resolution can be 51,200:1, which represents four orders of magnitude—a substantial improvement over certain conventional approaches. Other advantages, including but not limited to, greater speed, reduced cost and enhanced scale adaptability may also be obtained from the techniques discussed herein.

In view of the foregoing, scale 10 facilitates a method for measuring the weight of an object 22. In one embodiment, the method includes receiving the feedback signal 28 from the sensor 20. In response to determining that the received feedback signal 28 indicates that the weight of the object 22 upon the sensor 20 (via support 12) exceeds the weight range of the sensor 20, the controller 24, 54 drives current, represented as the drive signal 26, to the electromechanical force inducing mechanism 16, 52.

The driven current thereby generates a counterforce to the weight of the object 22, such that the weight of the object 22 upon the sensor 20 is within the sensitivity range thereof. Finally, at least one of the controller 24, and the processor 64 calculates the weight of the object 22 based upon a summation of an amount of the driven current and the feedback signal 28 received from the sensor operating within the weight range.

The terms "connected", "coupled" and "attached" are used herein to refer to any type of relationship, direct or indirect, between the components in question, and may apply to electrical, mechanical, RF, optical or other couplings, unless otherwise indicated. In addition, any uses of the term "first", "second", and so on herein are only to facilitate discussion, and do not necessarily infer any type of temporal or chronological relationship.

While embodiments have been described using electromagnetic force inducing mechanisms, it will be appreciated that the scope of the invention is not so limited, and is contemplated to include alternate methods of force generation, such as pneumatic, hydraulic, etc. force inducing mechanisms.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specifications, and following claims.

What is claimed is:

1. A scale, comprising:
   a support;
   a force transmitter having a driving end and a counterforce end;
   a sensor disposed between the support and the counterforce end, said sensor coupled to the support and productive of a sensor signal based upon an effect of a load upon the support, the sensor having a weight capacity;
   a force inducing mechanism coupled to the driving end of the force transmitter; and
   a controller coupled to the sensor and the force inducing mechanism, wherein the controller produces a drive signal in response to the load having a weight outside the weight capacity of the sensor;
   wherein the force inducing mechanism is responsive to the drive signal to exert a force on the driving end of the force transmitter and reduce the effect of the load; and
   wherein the controller computes the weight of the load based upon the drive signal and the sensor signal.

2. The scale of claim 1, wherein the effect of the load upon the sensor is reduced when the sensor is operating within the weight capacity.

3. The scale of claim 1, wherein the drive signal is based upon the sensor signal.

4. The scale of claim 3, wherein the force inducing mechanism comprises:
   a plunger coupled to the driving end of the force transmitter at a pivot; and
   an electromagnetic actuator coupled to the plunger, wherein a voltage applied to the electromagnetic actuator is controlled by the controller.

5. The scale of claim 4, further comprising a power amplifier to amplify the drive signal from the controller to the electromagnetic actuator.

6. The scale of claim 1, wherein the controller comprises:
   a pre-amplifier that amplifies the sensor signal;
   an analog to digital converter that converts the amplified sensor signal into a digital feedback signal;
   a processor that calculates and generates a digital drive signal based at least partly upon the digital feedback signal; and
   a digital to analog converter that converts the digital drive signal into an analog drive signal.

7. The scale of claim 6, wherein the processor computes the weight of the load based upon the digital drive signal.

8. The scale of claim 1, wherein the sensor comprises a strain gauge load cell.

9. The scale of claim 1, wherein the sensor comprises a linear variable differential transformer.

10. The scale of claim 1, wherein the sensor comprises an optical sensor.

11. The scale of claim 1, further comprising a stop coupled to the support to limit displacement thereof.

12. The scale of claim 11, wherein the stop is positioned proximate the counterforce end of the force transmitter.

13. A scale, comprising:
    a support;
    a lever having a driving end and a counterforce end and fixed to a pivot therebetween;
    a load cell coupled to the support, the load cell comprising a strain gauge mounted on a substrate that flexes in response to a change in a weight upon the support, the substrate disposed between the support and the counterforce end and the strain gauge configured to produce a strain signal that changes in response to the change in weight within a load cell weight range;
    an electromechanical force inducing mechanism coupled to the driving end of the lever;
    a controller coupled to the sensor and the electromagnetic force inducing mechanism, wherein the controller is configured to drive current to the electromechanical force inducing mechanism such that the counterforce end of the lever exerts sufficient counterforce on the support to maintain flexion of the substrate such that the load cell operates within the load cell weight range in response to changes in the weight on the support; and
    a processor that computes the weight of an object on the support based upon a signal from the controller, the signal from the controller based upon an amount of current driven to the electromechanical force inducing mechanism and the strain signal from the load cell.

14. A method for measuring a weight of an object, comprising:
    placing the object on a support;
    receiving a signal from a load cell based upon an effect of a load of the object upon the support;
    in response to the received signal indicating that the weight of the object upon the load cell exceeds a weight capacity of the load cell, driving current to an electromechanical force inducing mechanism;

in response to the driven current, generating a counterforce by an electromechanical force inducing mechanism to exert the counterforce via a counterforce end of a lever and to reduce the effect of the load, the counterforce sufficient to cause the apparent weight of the object as measured by the load cell to be within the weight capacity of the load cell; and calculating the weight of the object based upon an amount of the driven current and the signal received from the load cell operating within the weight capacity, wherein, the load cell is positioned between the counterforce end of the lever and the support.

15. The scale of claim 1, wherein the scale is configured such that the counterforce is applied to the sensor.

16. The scale of claim 13, wherein the scale is configured such that the counterforce is applied to the substrate.

17. The method of claim 14, wherein the counterforce is applied to the load cell.

* * * * *